United States Patent
Schneider

(10) Patent No.: US 7,881,304 B2
(45) Date of Patent: Feb. 1, 2011

(54) USING DISTRIBUTED ASPECTS TO REORDER ONLINE APPLICATION WORKFLOWS

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 191 days.

(21) Appl. No.: 12/129,584

(22) Filed: May 29, 2008

(65) Prior Publication Data
US 2009/0300138 A1    Dec. 3, 2009

(51) Int. Cl.
*H04L 12/28* (2006.01)
(52) U.S. Cl. .................................. 370/395.52
(58) Field of Classification Search ........................ None
See application file for complete search history.

(56) References Cited

U.S. PATENT DOCUMENTS

| | | | |
|---|---|---|---|
| 6,163,844 A | 12/2000 | Duncan et al. | |
| 6,321,267 B1* | 11/2001 | Donaldson ................. | 709/229 |
| 6,467,086 B1 | 10/2002 | Kiczales et al. | |
| 6,473,895 B1 | 10/2002 | Lopes et al. | |
| 6,539,390 B1 | 3/2003 | Kiczales et al. | |
| 6,571,295 B1* | 5/2003 | Sidana ....................... | 709/246 |
| 6,591,266 B1 | 7/2003 | Li et al. | |
| 7,140,007 B2 | 11/2006 | Lamping | |
| 2002/0087661 A1* | 7/2002 | Matichuk et al. ............ | 709/218 |
| 2002/0138589 A1* | 9/2002 | Al-Kazily et al. ........... | 709/217 |
| 2003/0014628 A1 | 1/2003 | Freed et al. | |
| 2005/0091374 A1 | 4/2005 | Ganesan et al. | |
| 2006/0026286 A1 | 2/2006 | Lei et al. | |
| 2006/0080546 A1 | 4/2006 | Brannon et al. | |
| 2006/0168199 A1 | 7/2006 | Chagoly et al. | |
| 2006/0288091 A1* | 12/2006 | Oh et al. ..................... | 709/219 |
| 2007/0022141 A1* | 1/2007 | Singleton et al. ......... | 707/104.1 |
| 2007/0022409 A1 | 1/2007 | Levenshteyn | |
| 2008/0034372 A1 | 2/2008 | Ganesan et al. | |
| 2008/0235352 A1* | 9/2008 | Yolleck et al. .............. | 709/219 |
| 2009/0019133 A1* | 1/2009 | Brimley ...................... | 709/218 |
| 2009/0158244 A1 | 6/2009 | Foumani | |
| 2009/0171733 A1* | 7/2009 | Bobak et al. ................... | 705/8 |

OTHER PUBLICATIONS

Navarro, L.D. et al., "Explicitly distributed AOP using AWED", *Proc. of 5th Int'l Conf. on Aspect-Oriented Software Developement*, (Bonn, Germany, Mar. 20-24, 2006, pp. 51-62.
Nishizawa, M. et al., "Remote pointcut: a language construct for distributed AOP", *Proc. of 3rd Int'l Conf. on Aspect-Orient Software Development* (Lancaster, UK, Mar. 22-24, 2004), pp. 7-15.

(Continued)

*Primary Examiner*—Chi H Pham
*Assistant Examiner*—Fan Ng
(74) *Attorney, Agent, or Firm*—Blakely, Sokoloff, Taylor & Zafman LLP

(57) ABSTRACT

One or more distributed aspect servers modify a sequence of online services provided by an application server that is remote from the aspect servers. A client sends a request to the application server. An aspect service is invoked if the request satisfies a criterion. The aspect service modifies the sequence of online services by performing at least one of adding a new online service, deleting one of the online services, or reordering the sequence of online services. The modified sequence of online services is provided to the client without incurring a change to the application server.

16 Claims, 10 Drawing Sheets

OTHER PUBLICATIONS

Zdun, Uwe, "Tailorable language for behavioral composition and configuration of software components", *Computer Languages, Systems & Structures*, vol. 32, Issue 1, Apr. 2006, pp. 56-82.

Fielding, R. et al., Hypertext Transfer Protocol—HTTP/1.1, Jun. 1999, 114 pages.

Krawczyk, H. et al., "HMAC: Keyed-Hashing for Message Authentication", Feb. 1997, 11 pages.

Song. J. et al., The Advanced Encryption Standard-Cipher-based Message Authentication Code-Pseudo-Random Function-128, Aug. 2006, 7 pages.

Rescorla, E., "HTTP Over TLS", May 2000, 7 pages.

Dierks, T., "The Transport Layer Security (TLS) Protocol Version 1.1", Apr. 2006, 82 pages.

Franks, J., et al., "HTTP Authentication: Basic and Digest Access Authentication", Jun. 1999, 32 pages.

Torvinen, V., et al., Hypertext Transfer Protocol (HTTP) Digest Authentication Using Authentication and Key Agreement (AKA) Version-2, Nov. 2005, 13 pages.

Office Action for U.S. Appl. No. 11/804,683, mailed Jun. 19, 2009, 15 pages (P153).

Office Action for U.S. Appl. No. 11/804,683, mailed Nov. 16, 2009 (P153).

Office Action for U.S. Appl. No. 12/129,670, mailed May 13, 2010 (P407).

Office Action for U.S. Appl. No. 12/129,670, mailed Nov. 10, 2009 (P407).

Largaisse, B. and Joose, W., "True and Transparent Distributed Composition of Aspect-Components," Middleware, 2006, pp. 42-61.

Win, Bart D., et al., Report of the Workshop on AOSD Technology for Application-Level Security (AOSDSEC), Report TW 387, Jun. 2005.

\* cited by examiner

USING DISTRIBUTED ASPECTS TO REORDER ONLINE APPLICATION WORKFLOWS

CROSS-REFERENCE TO RELATED APPLICATIONS

The present invention is related to co-filed U.S. patent application Ser. Nos. 12/129,668 and 12/129,670, which are assigned to the same assignee as the present application.

TECHNICAL FIELD

Embodiments of the present invention relate to aspect oriented software development, and more specifically, to applying aspects to the development of web applications.

BACKGROUND

Modern computer programs are typically created using modular programming approaches in which the various functions of a computer program are divided into interdependent modules. Each module is a component of a program that performs a specific set of related behaviors. Examples of such modular programming approaches include object oriented programming (e.g., Java, C++, etc.), where programs are structured as collections of interrelated objects and functional programming (e.g., Mathematica, Extensible Stylesheet Language Transformations (XSLT), etc.), where programs are structured as collections of mathematical functions.

Modular programming approaches are adept at modularizing design features that can be cleanly divided. However, design features that cannot be cleanly divided (e.g., where the same or similar functionality affects multiple different concerns) cannot typically be modularized. These design features are said to be crosscutting concerns, and occur when a concern depends on and/or must affect parts of the implementation of several distinct modules. A concern is a set of behaviors needed to perform a specific feature of a computer program, which has been implemented in a code structure. Concerns can be divided into core concerns and crosscutting concerns. A core concern is a concern that performs operations that relate to the main domain, or responsibility, of a module. These operations may be referred to as core operations. Core concerns are often referred to as business concerns. A crosscutting concern is a concern that spans multiple modules (e.g., that cannot be completely separated from other concerns). A crosscutting concern typically affects multiple core concerns. Examples of crosscutting concerns include security, data logging, session management, authentication, etc.

Implementing crosscutting concerns in traditional programming languages typically requires the same or similar bits of code throughout the program, resulting in code that is tangled and/or scattered. For example, by its nature a security concern cuts across, and must be uniformly applied to, many of the natural units of modularity of a computer program. Because the security concern cuts across multiple modules, it isn't reusable, can't be refined or inherited, and is spread throughout the program in an undisciplined manner.

Aspect oriented programming (AOP) is a programming approach that was developed to address the limited manageability of crosscutting concerns in conventional programming approaches. An aspect includes a concern that crosscuts the primary modularization of a program. An aspect oriented programming language encapsulates crosscutting concerns in a number of special purpose program modules called aspects, rather than spreading the implementation of such concerns throughout the modules that include core concerns of a program. An aspect is the unit of modularity for crosscutting concerns, and includes a pointcut and advice. A pointcut is program code that picks out certain join points (a clearly definable point in a program flow, examples of which include method calls, exception throws, etc.) and values at those points. Advice is code (e.g., one or more operations) that can be executed when a join point is reached. Advice can define crosscutting functionality that transparently forces a modification to a core concern or adds additional functionality to a core concern. Advice is divided into before advice and after advice. Before advice is advice that runs as a join point is reached, before the program proceeds with the join point. After advice is advice that runs after the program proceeds with the join point.

Aspects can be applied to modules in well defined ways. For example, an aspect applied to a program constructed using an object oriented approach can affect the implementation of several classes (or several methods within a single class) in a clean, principled manner.

In conventional aspect oriented approaches, aspect code must be collocated with standard (non-aspect) code on a computer system. Therefore, if multiple networked computing systems implement the same aspect, they must each include a separate local instance of the same aspect code. Current aspect oriented programming languages also require that the aspect code and the standard code be compiled together. If the aspect code is not compiled together with the standard code, the aspects cannot typically be applied to core concerns of compiled program. This can slow down the development and/or implementation of computer programs.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
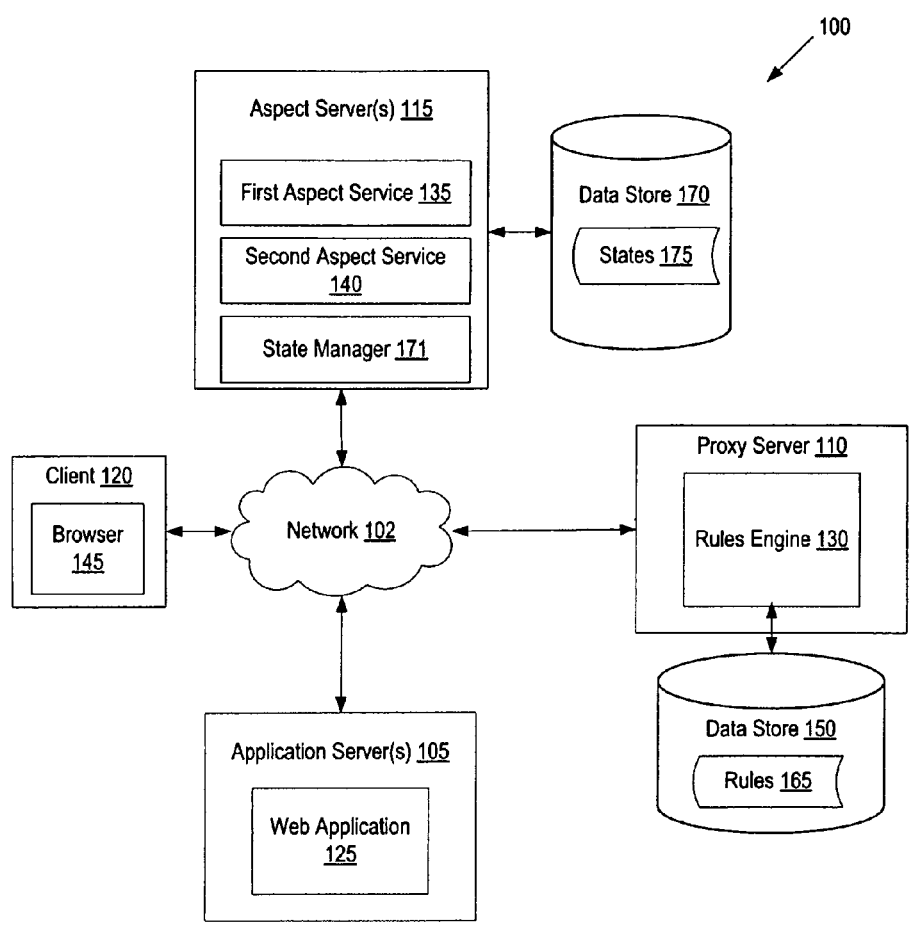
FIG. 1 illustrates an exemplary network architecture in which embodiments of the present invention may operate.

Described herein is a method and system for providing aspect services. In one embodiment, one or more distributed aspect servers modify a sequence of online services provided by an application server that is remote from the aspect servers. A client sends a request to the application server. An aspect service is invoked if the request satisfies a criterion. The aspect service modifies the sequence of online services by performing at least one of adding a new online service, deleting one of the online services, or reordering the sequence of online services. The modified sequence of online services is provided to the client without incurring a change to the application server.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "providing", "forwarding", "receiving", "invoking", "forming", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary network architecture 100 in which embodiments of the present invention may operate. The network architecture 100 may include a application server 105, a proxy server 110, an aspect server 115, and a client 120 connected via a network 102, which may be a private network (e.g., a local area network (LAN), wide area network (WAN), intranet, etc.) or a public network (e.g., the internet).

Client 120 may be a computing device such as, for example, a desktop computer, laptop computer, server, cellular phone, personal digital assistant (PDA), etc. In one embodiment, client 120 includes a browser 145 (e.g., a web browser) that enables client 120 to access information maintained by, and use services provided by, application server 105, proxy server 110 and/or aspect server 115. Browser 145 is an application that enables client 120 to display and interact with text, images, and other information provided by servers. Browser 145 may be a web browser configured to display web pages (e.g., by using hypertext transfer protocol (HTTP), extended markup language (XML), javascript, etc.). In an alternative embodiment, client 120 initiates service requests without use of a browser 145.

Application server 105 provides one or more online services (e.g., database services, systems management services, network monitoring services, transactional services, webpage viewing services, email services, authentication services, translation services, etc.) to client 120. Application server 105 may be a front end server (e.g., that provides an interface to client 120) and/or a back end server. Through the application server 105, users of client 120 may request data, initiate actions, receive information, etc. via service requests. Additional application servers (not shown) may also be connected with network 102 to provide additional online services.

In one embodiment, application server 105 is a web application server, and includes a web application 125 that provides services and/or information to client 120. Such services may include, for example, online retail sales, webmail, online auctions, discussion boards, web logs (blogs), etc. Application server 105 may receive a service request from client 120 or proxy server 110. Based on the contents of the service request, application server 105 may determine that web application 125 should perform one or more actions, after which application server 105 may return a service response to the client 120 or proxy server 110. Though only a single web application 125 is shown, application server 105 may include multiple web applications 125 and/or other services.

The web application 125 may be configured to include one or more core concerns. The core concerns perform functions, referred to as core operations, that relate to the main domain or responsibility of the web application 125. In one embodiment, the web application 125 is configured to only perform functions that relate to core concerns. In such an embodiment, crosscutting concerns are not included in the web application 125. Alternatively, some cross cutting concerns may be included in the web application, while others are not included. In an example, if the web application 125 provides a web log (blog), the web application 125 may only include functionality for posting to and displaying the blog, both of which are core concerns of the blog. Additional functionality such as authentication, security, and so on, which are not core concerns of the blog, may not be included in the web application 125. This can simplify the programming, upgrading, maintenance, etc. of the web application 125 by reducing the amount of instructions (e.g., coding) that it includes. This can also simplify coding, upgrading, maintenance, etc. of aspect services that include the crosscutting concern (described in greater detail below). For example, rather than performing the same upgrade to multiple different systems that include the same aspect, only a single aspect service that is used by multiple different applications may be upgraded.

Aspect server 115 is a server that provides specialized services known as aspect services. In one embodiment, aspect server 115 includes a single aspect service (e.g., first aspect service 135). Alternatively, aspect server 115 may include multiple aspect services (e.g., first aspect service 135 and second aspect service 140). Additional aspect servers (not shown) may also be connected with network 102 to provide additional aspect services. In one embodiment, aspect server 115 acts as a before advice handler. In such an embodiment, all aspect services hosted by the aspect server 115 therefore perform operations of a crosscutting concern before the web application 125 performs operations of a core concerns. Examples of such aspect services include authentication services, security services, etc. In another embodiment, aspect server 115 acts as an after advice handler. In such an embodiment all aspect services hosted by the aspect server 115 perform operations of a crosscutting concern after the web application 125 completes operations of a core concern. Examples of such aspect services include web page altering services, censoring services, etc.

An aspect service 135, 140 is an aspect that is remote from an application (e.g., web application 125) whose functionality is supplemented by the aspect (e.g., the functionality of the crosscutting concern provided by the aspect is added to the functionality of the application). Each aspect service 135, 140 can be accessed over network 102, and executed on aspect server 115. Aspect server 115 provides the aspect services 135, 140 to web application 125 and/or additional web applications (not shown) that are hosted by application server 105 or additional application servers (not shown).

Aspect services 135, 140 may be requested by a web application 125, or initiated based on service requests and or service responses. A request for an aspect service is herein referred to as an aspect request. A result generated by an aspect service in response to an aspect request is referred to here in as an aspect response. In one embodiment, aspect requests are generated by processing logic hosted by application server 105 (e.g., by web application 125). In another embodiment, aspect requests are generated by processing logic hosted by proxy server 110.

Each aspect service 135, 140 can add functionality of a distinct crosscutting concern to web application 125. Examples of aspect services include services that provide authentication, logging, security, session management, web page reformatting, content filtering, database transactions, etc. For example, first aspect service 135 may provide authentication functionality to web application 125, and second aspect service 140 may provide session management functionality to web application 125. Aspect services 135, 140 allow for programs that rely on specific crosscutting concerns (e.g., authentication, security, etc.) to be designed and written independently of an underlying authentication, security, or other crosscutting behavior. For example, web application 125 may not have certain crosscutting capabilities, and instead may rely on aspect services 135, 140 to provide such capabilities.

Once aspect requests are processed by aspect services 135, 140, the aspect services 135, 140 generate aspect responses. The aspect responses may then be sent back to the machine (e.g., server or client) and/or application (e.g., web application 125) from which an aspect request was received. Alternatively, the aspect response may be sent to a machine and/or application that is different than a machine and/or application from which the aspect request was received. For example, the aspect request may be received from proxy server 110, and the aspect response may be sent to client 120.

Some aspect services require additional information to be able to complete the operations of a specified crosscutting concern. When additional information is needed, the aspect service may include a request for information in the aspect response. Upon receipt of the requested information the aspect service may generate a new aspect response, and send it to an appropriate machine and/or application.

In one embodiment, aspect server 115 includes a state manager 171, and is connected to a data store 170 that stores one or more states 175. States 175 track the interactions between client 120, application server 105, aspect server 115 and proxy server 110, and include information input by client 120. Data store 170 may include one or more storage devices that are local to aspect server 115 and/or remote from aspect server 115. The data store 170 may manage data via a file system, database, or other data management configuration.

In one embodiment, states 175 include session states. A session starts the first time client 120 (e.g., browser 145 under the direction of a user) initiates a request in a chain of related requests (e.g., a request to view a first web page in a sequence of web pages). Each session is associated with a session identifier, which is typically a fixed-length numerical string stored as a cookie with client 120. The session identifier and its associated session information is generally created and maintained by application server 105 and received by client 120. As will be described in greater detail below with reference to FIGS. 3B and 4B, information generated by client 120 may sometimes be intercepted by aspect server 115 and not reach application server 105. Thus, to keep track of the states of interactions and to locate the data of a particular client, aspect server 115 may use state manager 171 to generate its own session identifier similar to the session identifier generated by application server 105. Alternatively, proxy server 110 may create and maintain the session identifier and its associated session information on behalf of application server 105. In this alternative embodiment, proxy server 110 may pass the session identifier to aspect server 115 for state manager 117 to store and retrieve information of a particular client.

In another embodiment, state manager 171 may use a Message Authentication Code (MAC) as an identifier, instead of the session identifier, for identifying information of a particular client. State manager 171 may compute the MAC by performing a one-way transformation of the data generated by client 120. A MAC is a cryptographic code that authenticates a message (e.g., the data generated by client 120). State manager 171 has a secret key that is applied to the data to compute a MAC, which is used as a key to identify the data. When aspect server 115 receives client data from client 120, state manager 171 computes the MAC using the client data, and stores the client data with the MAC. Next time aspect server 115 serves a web page on behalf of application server 105, the MAC is passed to client 120 with the served web page. Client 120 then passes additional client requests or client data along with the MAC back to aspect server 115 via proxy server 110. With the use of the MAC, aspect server 115 is able to keep track of the related client requests and client data.

In one embodiment, the MAC may be used to annotate the Universal Resource Locators (URLs) of the web pages to which client data is directed. After state manager 171 computes a MAC, it may use the MAC to annotate a URL, and sends the annotated URL to client 120 with a response of aspect server 115. Client 120 can then send a subsequent request/data with the annotated URL. The annotated URL allows state manager 171 to relate one request to another, as well as keep track of the client data that is sent with the annotated URL. According to existing web protocols, client 120 passes URLs with client requests and/or client data in order to receive a web service. Thus, embedding the MAC in these URLs incurs minimal overhead. For example, if the MAC of initial client data is computed to be 0123456789abcdef, and the URL to which additional client request/data is directed is http://www.example.com/app/FirstPage ("URL1"), URL1 may be annotated to be http://www.example.com/app/FirstPage/0123456789abcdef, http://www.example.com/app/0123456789abcdef/FirstPage, or http://www.example.com/0123456789abcdef/app/FirstPage.
When receiving the initial client data, state manager 171 stores the client data with the MAC. Thus, state manager 171 can retrieve the stored client data in response to the additional client request/data that includes a reference to the MAC.

Alternatively, state manager 171 may compute a MAC using both the client data and the URL to which the client data is directed. Using the above URL1 as an example, the combination of URL1 and the client data results in a MAC, referred herein as ${MAC1}$. URL1 may be annotated as http://www.example.com/${MAC1}$, http://www.example.com/app/${MAC1}$, or the like. This alternative approach is slightly more complex than the previously-mentioned approaches, but may prevent a malicious attacker from exploiting security bugs and provide for a more secure implementation.

In some embodiments, a hash value or a random string may be used as an identifier instead of a MAC. However, a MAC is more secure than a hash value or a random string, as the MAC can only be computed by the owner of the secret key, i.e., state manager 171. Thus, a MAC serves as a positive security check of the stored client data at the time the data is retrieved to be used. A random string or a hash value provides no or minimal authentication of the stored data.

State manager 171 use the above-described identifiers as a key to store information provided by client 120, which will be needed later in the chain of requests. Aspect server 115 may use the identifier to reorder a sequence of web pages that are provided to client 120. The process of reordering online application workflows will be described in greater detail with reference to FIGS. 4A-4C.

Proxy server 110 is a server that can intercept service requests that are directed to web application 125. Proxy server 110 can then forward the service requests to appropriate servers (e.g., application server 105 or aspect server 110), aspect services and/or applications. Alternatively, requests for specific resources and/or services offered by web application 125 may be directed to proxy server 110. Proxy server 110 may then determine an appropriate destination for the received requests. In one embodiment, proxy server 110 receives messages directed to different web application servers, and forwards the messages to appropriate web application servers and/or aspect servers.

In one embodiment, proxy server 110 generates aspect requests upon receiving service requests and or upon receiving service responses. The aspect requests may then be sent to aspect server 115. In one embodiment, aspect requests include the service request or service response. After sending an aspect request to aspect server 115, proxy server 110 may wait for a response. If an aspect response is received, proxy server 110 forwards the aspect response to the client 120 and/or application server 105. In one embodiment, if the aspect response is a null response, proxy server 110 forwards the service request to application server 105.

In one embodiment, proxy server 110 includes a rules engine 130, and is connected to a data store 150 that stores one or more rules 165. Data store 150 may include one or more storage devices that are local to proxy server 110 and/or remote from proxy server 110. The data store 150 may manage data via a file system, database, or other data management configuration.

In one embodiment, rules 165 may include criteria for proxy server 110 to distribute workload among multiple aspect servers 115 and application servers 105. Based on the criteria, proxy server 110 determines to which aspect servers 115 to forward an aspect request, and to which application server 105 to forward the results generated by aspect servers 115. The distribution of workload may depend on how coupled the aspect servers 115 are. If the aspect servers 115 all have access to a common data store and rules set, proxy server 110 can forward related requests to an aspect server that has the capacity to handle the requests. If a given aspect server 115 only handles requests relating to certain URLs, proxy server 110 can multiplex aspect requests based on the URLs such that each aspect server only receives a small subset of the requests processed by proxy server 110.

In another embodiment, rules 165 may include criteria for determining which particular aspect service (e.g., first aspect service 135 or second aspect service 140) to invoke. A rule 165 is an abstract structure that describes a formal language precisely (e.g., a set of rules that mathematically delineates a (usually infinite) set of finite-length strings over a (usually finite) alphabet). Rules 165 may perform actions, provide information, help process messages, etc. A rule 165 may include conditional elements (e.g., and, or, not, exists, etc.), constraints (e.g., equal to, not equal to, greater than, contains, etc.) and consequences or actions (e.g., decrypt message, process next rule, forward message to aspect server, forward message to application server, initiate an aspect service, etc.).

In one embodiment, a rule 165 dictates an aspect service to initiate. In another embodiment, a rule 165 causes an aspect request to be generated and sent to aspect server 115. The aspect request includes instructions to initiate a specific aspect service. The rule 165 may also cause a received service request to be forwarded to aspect server 115. Rule 165 may also perform other functions.

In one embodiment, each rule 165 includes a pointcut that identifies when an aspect service should be initiated. Each rule 165 may further be associated with a specific aspect service. If the pointcut indicates that the aspect service is to be initiated upon receipt of a service request, then the aspect service can provide before advice. If the pointcut indicates that the aspect service is to be initiated upon receipt of a service response, then the aspect service can provide after advice.

Rules engine 130 may be a logic component that processes rules 165 to produce outcomes. The rules engine 130 may match facts, data and rules 165, and infer conclusions which may result in actions or events. The rules engine 130 may match the facts, data and rules 165 using, for example, a Rete Algorithm, a Linear Algorithm, a Treat Algorithm, a Leaps Algorithm, etc. Hybrid algorithms that use combinations of, for example, the Leaps Algorithm and the Rete Algorithm, may also be used.

Rules engine 130 may use rules 165 to determine whether to initiate specified aspect services 115 whenever an incoming message (e.g., a service request) or outgoing message (e.g., a service response) is received. Such decisions may be made based on message contents (e.g., message header, message context, message body, URLs, portions of a web page being transmitted, etc.). For example, a first rule may specify that a client from which a service request is received must be authenticated before the service request will be sent on to application server 105. The first rule may further specify that the service request is to be forwarded to aspect server 115, and that first aspect service 135 is to be initiated to authenticate the client 120. Once the client has become authenticated, the rules engine 130 may apply a rule 165 that passes on service requests from the client 120 to their destination (e.g., to web application 125).

In one embodiment, rules 165 used by rules engine 130 are scripted. Alternatively, such rules 165 may be compiled. Moreover, aspect services may also be scripted or compiled. This can enable new rules and/or aspect services to be added, and existing rules and/or aspect services to be modified without requiring compiling. This can reduce the time required to develop applications, can provide fast prototyping, and can provide enhanced flexibility.

In one embodiment, the functions of the aspect server 115 and the proxy server 110 are combined. In such an embodiment, the rules engine 130 may determine whether any aspect services should be initiated. Such aspect services may then be automatically initiated without the need to send any messages to a remote server.

In another embodiment, the rules engine 130 is included in the aspect server 115, and not in the proxy server 110. In such an embodiment, the proxy server 110 may be configured to forward incoming and outgoing messages to one specific aspect server 115. The aspect server 115 may then use the rules engine 130 to determine whether to initiate any aspect services before sending the message back to proxy server 110, application server 105, or client 120. Alternatively, the rules engine may be included in an additional server (not shown).

In yet another embodiment, both proxy server 110 and aspect server 115 may include a rules engine. After receiving an aspect request, the aspect server 115 may compare the aspect request to a set of rules using the rules engine. If the aspect request matches a criterion or criteria specified in a rule, the aspect server 115 may generate an additional aspect request and send it to an additional aspect server. The additional aspect server may also include a rules engine, and may generate yet another aspect request and send it to yet another aspect server. In this manner, aspect services may be daisy chained, and some aspect services may initiate and/or depend on other aspect services. For example, a login service may be required to be initiated before a session management aspect service can be initiated.

In still another embodiment, the rules engine may be hosted by application server 105. The rules engine may examine incoming service requests and or outgoing service responses, and compare these messages to stored rules. If the criteria included in a rule are satisfied, an aspect request may be generated and sent from the application server 105 to the aspect server 115.

Figure 2A:
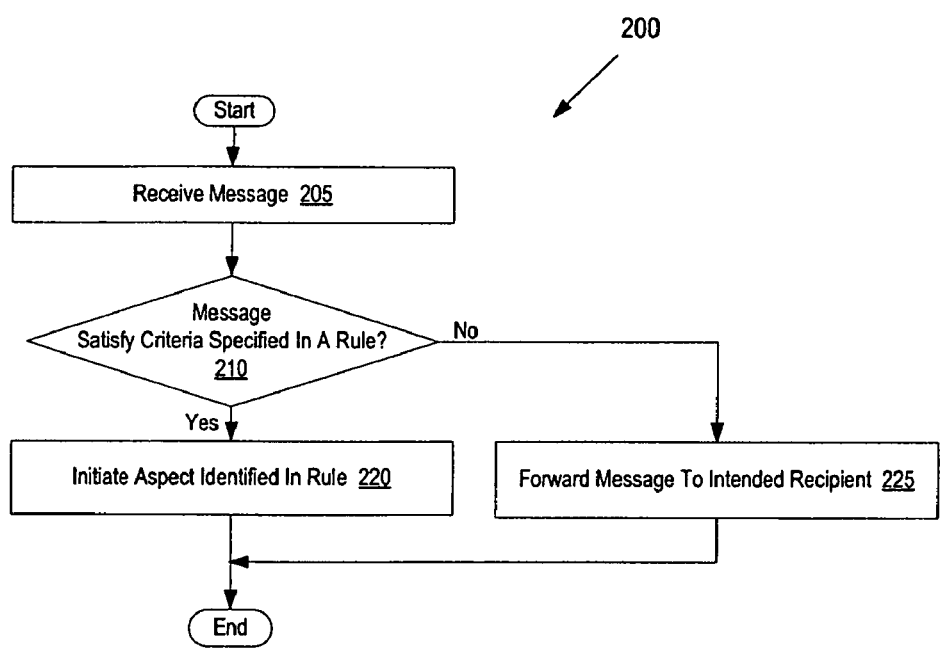
FIG. 2A is a flow diagram illustrating one embodiment of a method for providing aspect services.

FIG. 2A is a flow diagram illustrating one embodiment of a method 200 for providing aspect services. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, method 200 is performed by proxy server 110 and/or aspect server 115 of FIG. 1.

Referring to FIG. 2A, at block 205 of method 200 processing logic receives a message. The message may be a service request that has been generated by a client and that is addressed to a web application. The message may also be a service response that has been generated by a web application after the web application has completed one or more operation associated with the requested service. The message may be addressed to the client that generated the service request.

At block 210, processing logic compares the message to one or more rules using a rules engine. Each rule may include criteria that must be met before an action indicated by the rule is performed. In one embodiment, each rule is associated with a distinct web application. Alternatively, a single rule may be associated with multiple different web applications. In one embodiment, each rule identifies an aspect service that is to be initiated if the criteria specified in the rule are satisfied. If the criteria specified in a rule are satisfied, then the method proceeds to block 220. If the message does not match criteria specified in any rule, than the method proceeds to block 225.

At block 220, the aspect service identified by the rule is initiated. The aspect service may be, for example, an authentication service, a security service, a webpage formatting service, and so on. At block 225, processing logic forwards the message to an intended recipient (e.g., forwards a service request to a web application specified in a header of the request or a service response to a client specified in a header of the response). The method then ends.

Figure 2B:
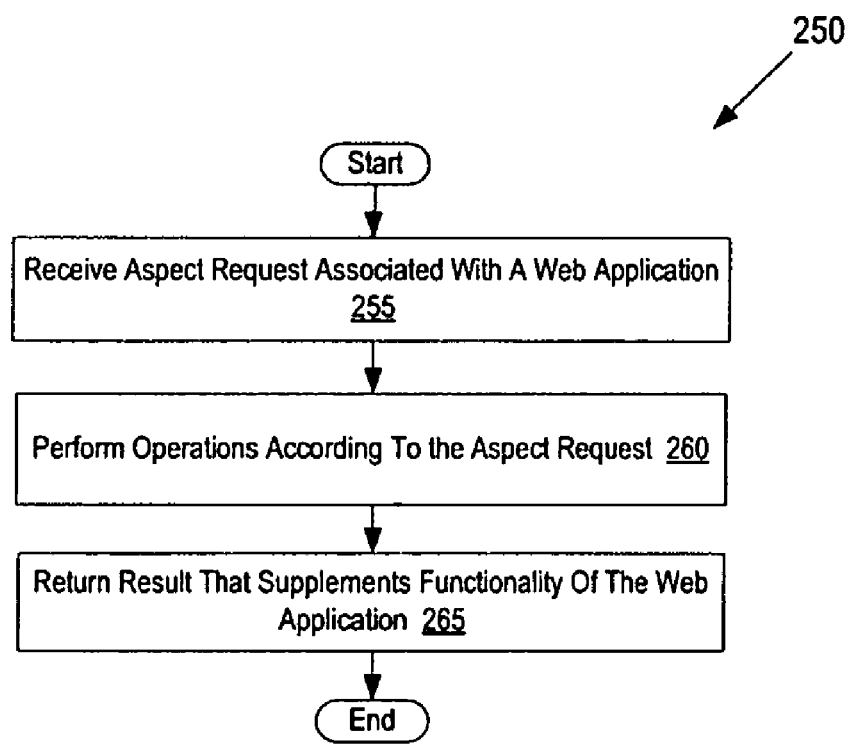
FIG. 2B is a flow diagram illustrating another embodiment of a method for providing aspect services.

FIG. 2B is a flow diagram illustrating another embodiment of a method 250 for providing aspect services. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 250 is performed by aspect server 115 of FIG. 1.

Referring to FIG. 2B, at block 255 of method 250 processing logic receives an aspect request associated with a web application. An aspect request is a service request that is directed to an aspect service. In one embodiment, the aspect request is received from a proxy server. The proxy server may send the aspect request to the aspect server along with a service request directed to the web application or a service response that was generated by the web application. In one embodiment, the web application associated with the aspect request is a web application to which a service request that caused the aspect request to be generated is addressed. In another embodiment, the web application associated with the aspect request is a web application that generated a service response that caused the aspect request to be created. In yet another embodiment, the aspect request is received from a web application, and is therefore associated with the web application.

At block 260, processing logic performs operations according to the aspect request. In one embodiment, the operations are performed by an aspect service. The aspect service may use information in the aspect request and/or an accompanying service request or service response to perform the operations. The operations performed by the aspect service are associated with a distinct crosscutting concern. For example, the aspect service may perform operations that authenticate a client, that log information associated with a transaction, etc. The operations performed by the aspect service may include storing and/or retrieving information submitted from the client using an identifier.

At block 265, processing logic returns a result that supplements functionality of the web application. For example, if the web application is an online commerce application, the aspect service may supplement functionality of the web application by providing security, or by logging a transaction. This can leave the online commerce application to perform core concerns such as displaying wares and processing orders. The aspect service may also modify the web pages provided by the web application. For example, the aspect service may add a web page, delete a web page, or reorder the web pages that are presented to the client.

Figure 3A:
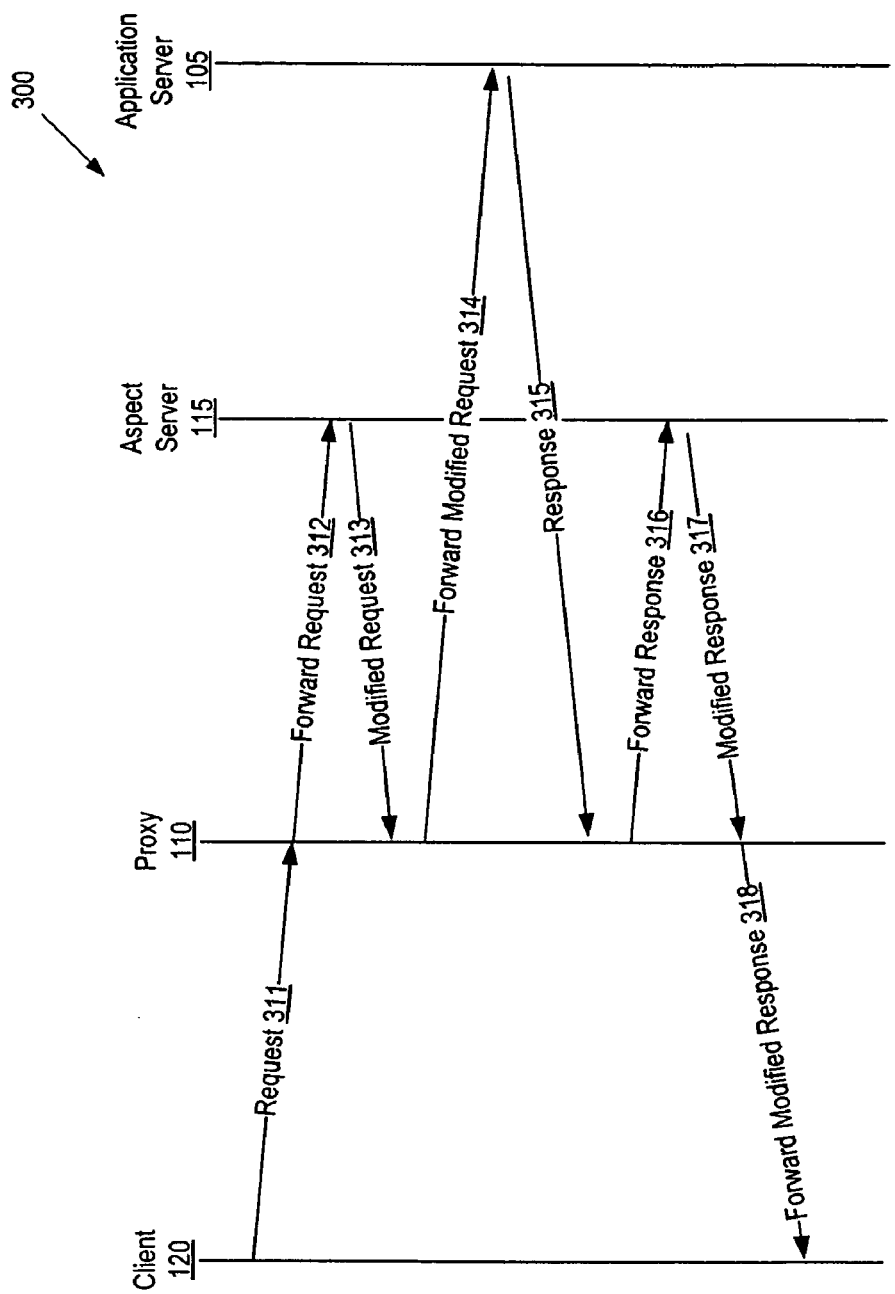
FIG. 3A is a data flow diagram that shows data transmitted between a client, a proxy server, an aspect server and an application server, in accordance with another embodiment of the present invention.

FIG. 3A is a diagram 300 that shows data transmitted between client 120, proxy server 110, aspect server 115 and application server 105 of FIG. 1, in accordance with one embodiment of the present invention. In one embodiment, all transmissions are achieved using a secure channel such as, for example, secure sockets layer (SSL), secure hypertext transfer protocol (HTTPS), etc. Alternatively, an unsecure channel may be used for some or all transmissions. The diagram 300 illustrates data transmissions that can be made in an embodiment of the present invention where proxy server 110 forwards all client requests and all responses from application server 105 to aspect server 115. Further, in the embodiment of FIG. 3, aspect server 115 has access to all or part of rules 165 to determine appropriate aspect service to be initiated. Proxy server 110 and aspect server 115 may be physically collocated on the same machine or in separate machines/locations.

Referring to FIG. 3A, at transmission 311, proxy server 110 receives a service request. The received service request is received from client 120 and is addressed to a web application. At transmission 312, proxy server 110 forwards the service request to aspect server 115. Aspect server 115 matches the service request with one or more rules that identify an appropriate aspect service to be initiated. The identification of the aspect service may include a service address, such as the URL of the requested web page. Aspect server 115 applies the aspect service to the service request to produce a modified request, and at transmission 313, sends the modified request to proxy server 110. At transmission 314, proxy server 110 forwards the modified request to application server 105. Application server 105 generates a response to service the modified request and, at transmission 315, sends the response to proxy server 110. At transmission 316, proxy server 110 forwards the response to aspect server 115, which generates a modified response. At transmission 317, aspect server 115 sends the modified response to proxy server 110. At transmission 318, proxy server 110 forwards the modified response to client 120.

It is understood that the terms "modified request" and "modified response" are merely used to distinguish them from the original request and original response. A modified request and a modified response provided by aspect server 115 may include changes to the original request and original response, or may be the same as the original request and original response.

Figure 3B:
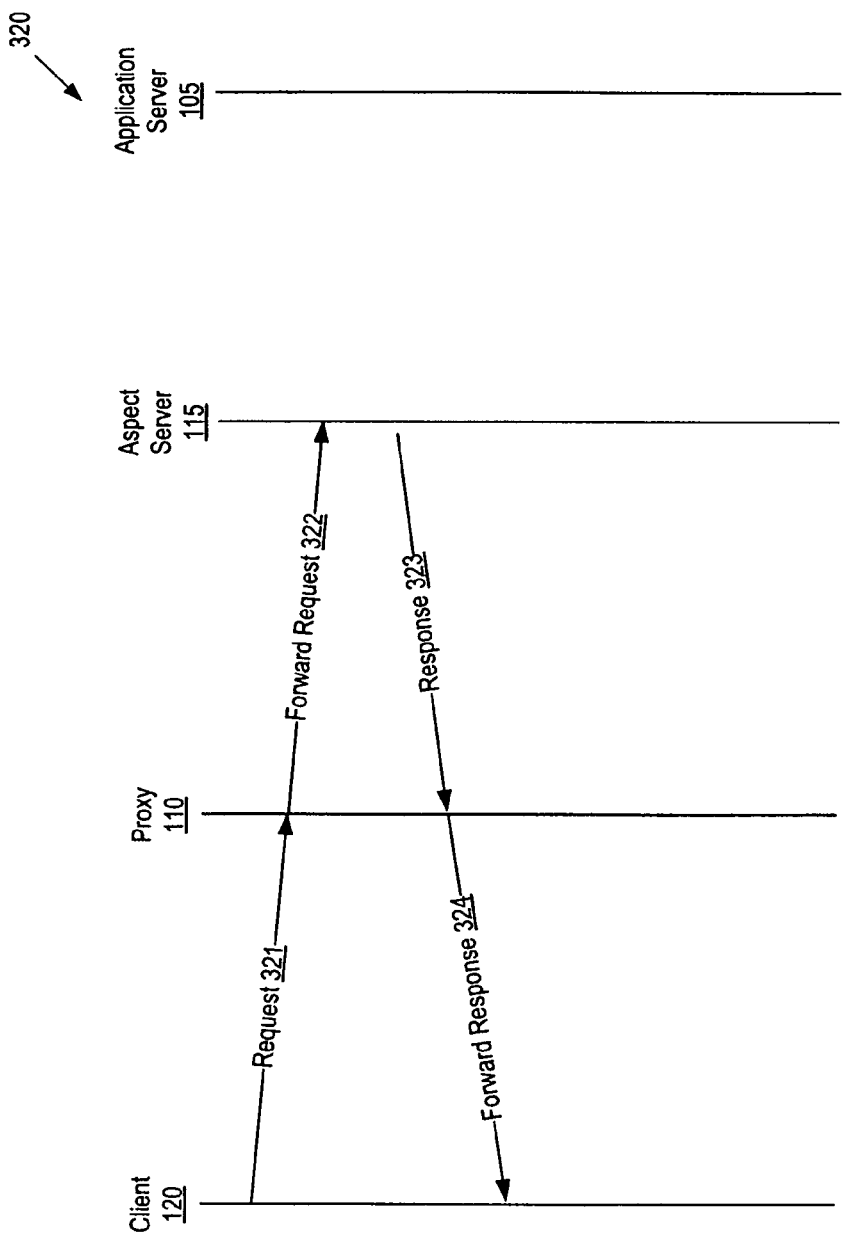
FIG. 3B is another data flow diagram that shows data transmitted between a client, a proxy server and an aspect server, in accordance with another embodiment of the present invention.

In one scenario, aspect server 115 may short-circuit transmissions 313-316 if the client's request satisfies a criterion specified in one or more rules 165 (e.g., the requested URL matches the URLs specified in a rule). In this scenario, aspect server 115 generates a response to client 120 without involving application server 105. FIG. 3B is a diagram 320 showing a transmission sequence in such a scenario. The transmission sequence of diagram 320 is modified from diagram 300 of FIG. 3A.

At transmission 321, proxy server 110 receives a service request. The received service request is received from client 120 and is addressed to a web application. At transmission 322, proxy server 110 forwards the service request to aspect server 105. Aspect server 115 matches the service request with one or more rules that identify appropriate aspect service to be initiated, initiates the aspect service to address a crosscutting concern, and generates a response. At transmission 333, aspect server 115 sends the response to proxy server 110, and also informs proxy server 110 not to contact application server 105. At transmission 324, proxy server 110 forwards the response to client 120.

Figure 3C:
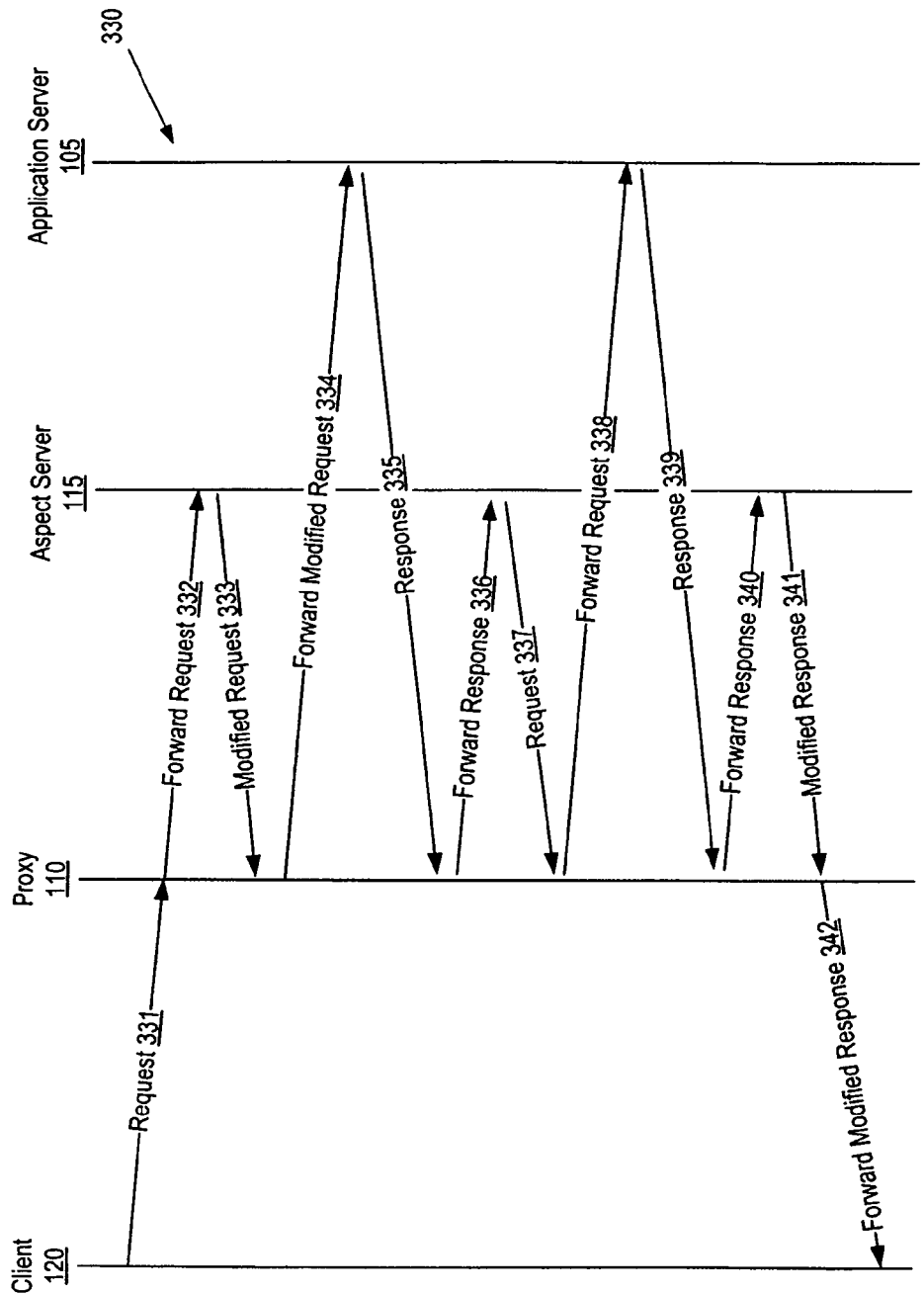
FIG. 3C is yet another a data flow diagram that shows data transmitted between a client, a proxy server, an aspect server and an application server, in accordance with another embodiment of the present invention.

In another scenario, aspect server 115 may generate additional requests after it receives the application server's response that is forwarded by proxy server 110. The additional requests may be generated if the application server's response satisfies a criterion specified in one or more rules 165. Referring to FIG. 3A, after receiving transmission 316, aspect server 115 generates one or more additional requests, which are forwarded to application server 105 by proxy server 110. In this scenario, aspect server 115 generates the additional requests to application server 105 without involving client 120. FIG. 3C is a diagram 330 showing a transmission sequence in such a scenario. The transmission sequence of diagram 330 is modified from diagram 300 of FIG. 3A.

Referring to FIG. 3C, transmissions 331-336 are identical to transmissions 311-316 of FIG. 3A. After receiving the response of application server 105 that is forwarded from proxy server 110 at transmission 336, aspect server 115 generates a request to application server 105 to address a crosscutting concern, and sends the request to proxy server 110 at transmission 337. At transmission 338, proxy server 110 forwards the request to application server 105, which generates a response. At transmission 339, application server 105 sends the response to proxy server 110, which forwards the response to aspect server 115 at transmission 340. Transmissions 337-340 may be repeated until all cross-cutting concerns are addressed. In response to the response, aspect server 115 generates a modified response and sends the modified response to proxy server 110 at transmission 341. At transmission 342, proxy server 110 forwards the modified response to client 120.

The transmission scenarios described above in FIGS. 3A-3C allow aspect server 115 to supplement or modify the online services provided by application server 105. In an embodiment where application server 105 provides a sequence of web pages, aspect server 115 may add a web page to any location in the sequence, delete a web page from any location in the sequence, or reorder the sequence of web pages.

Figure 4A:
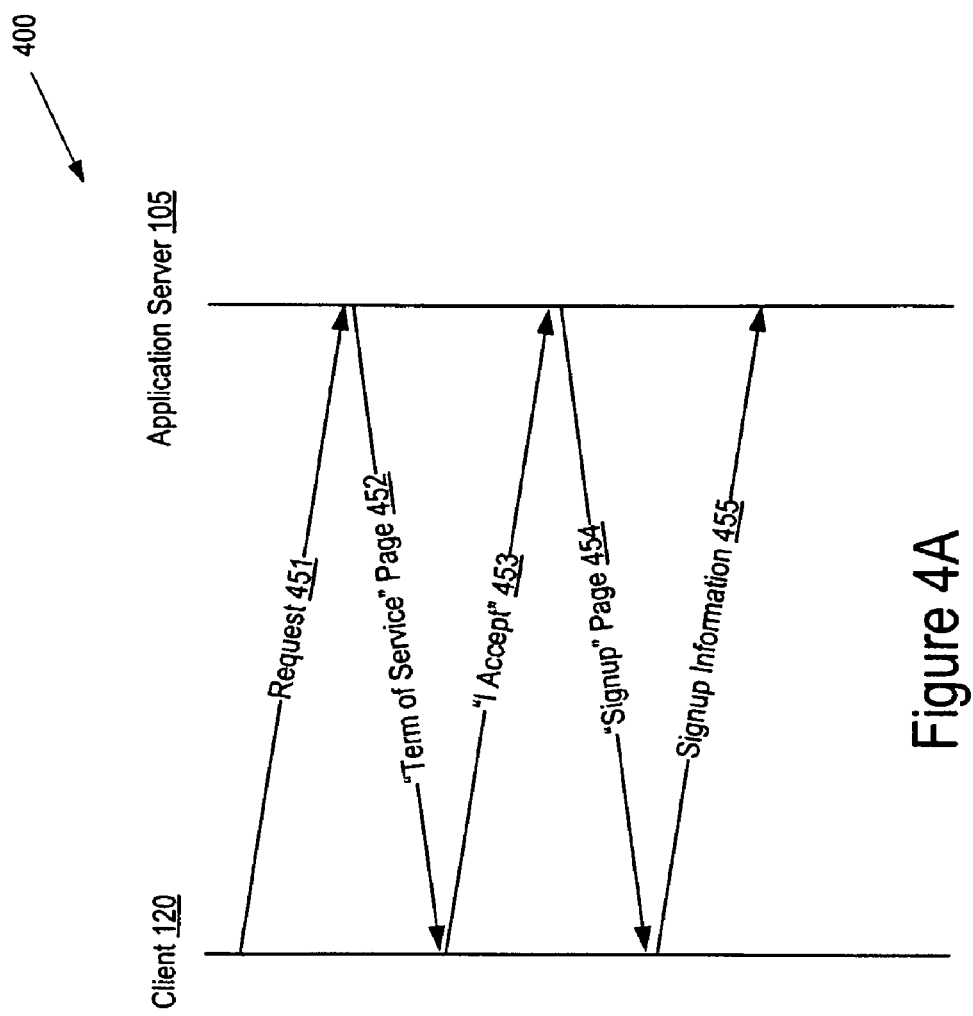
FIG. 4A illustrates a data flow diagram that shows data transmitted between a client and an application server according to an original workflow of the application server.
Figure 4B:
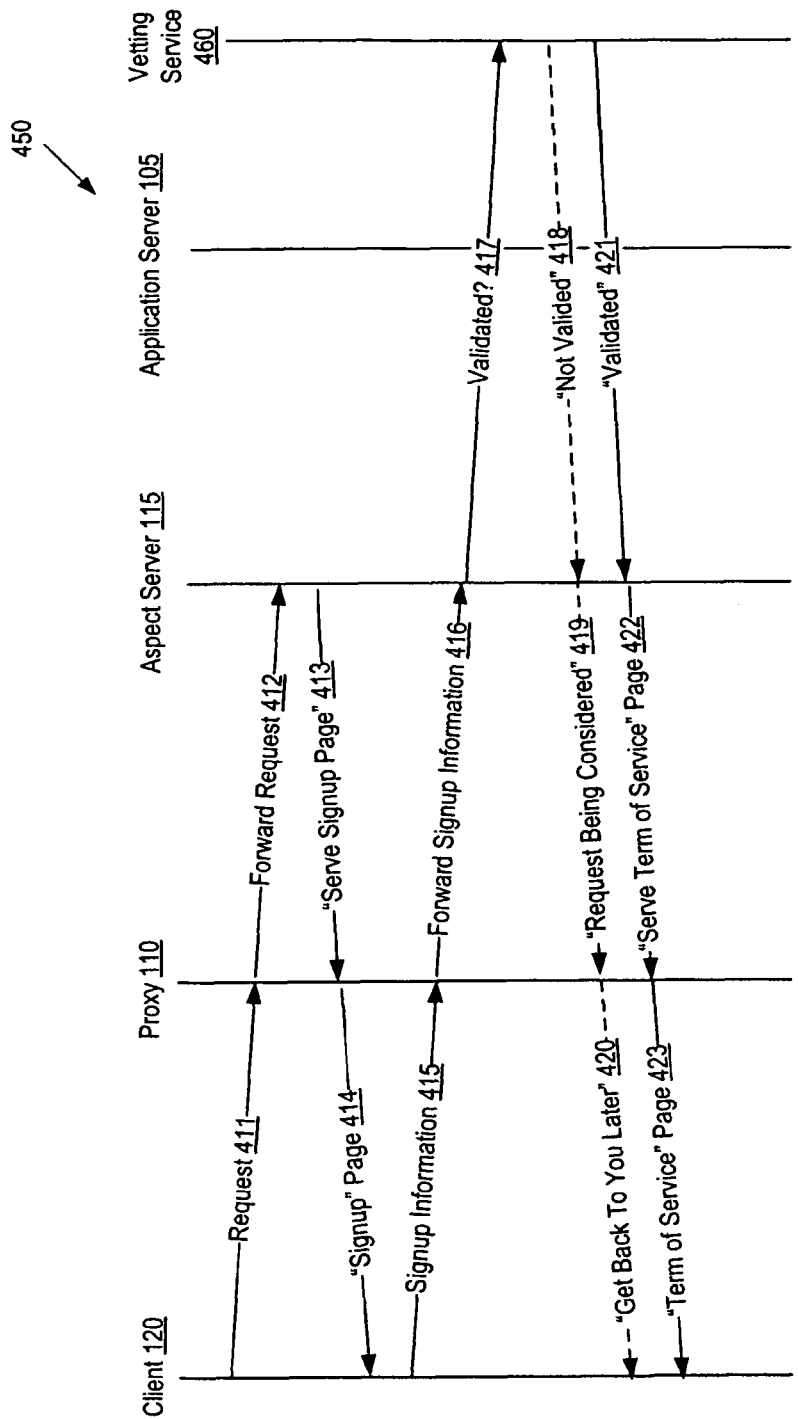
FIG. 4B is a data flow diagram that shows data transmitted between a client, a proxy server, an aspect server, an application server and a vetting service for reordering the workflow, in accordance with another embodiment of the present invention.
Figure 4C:
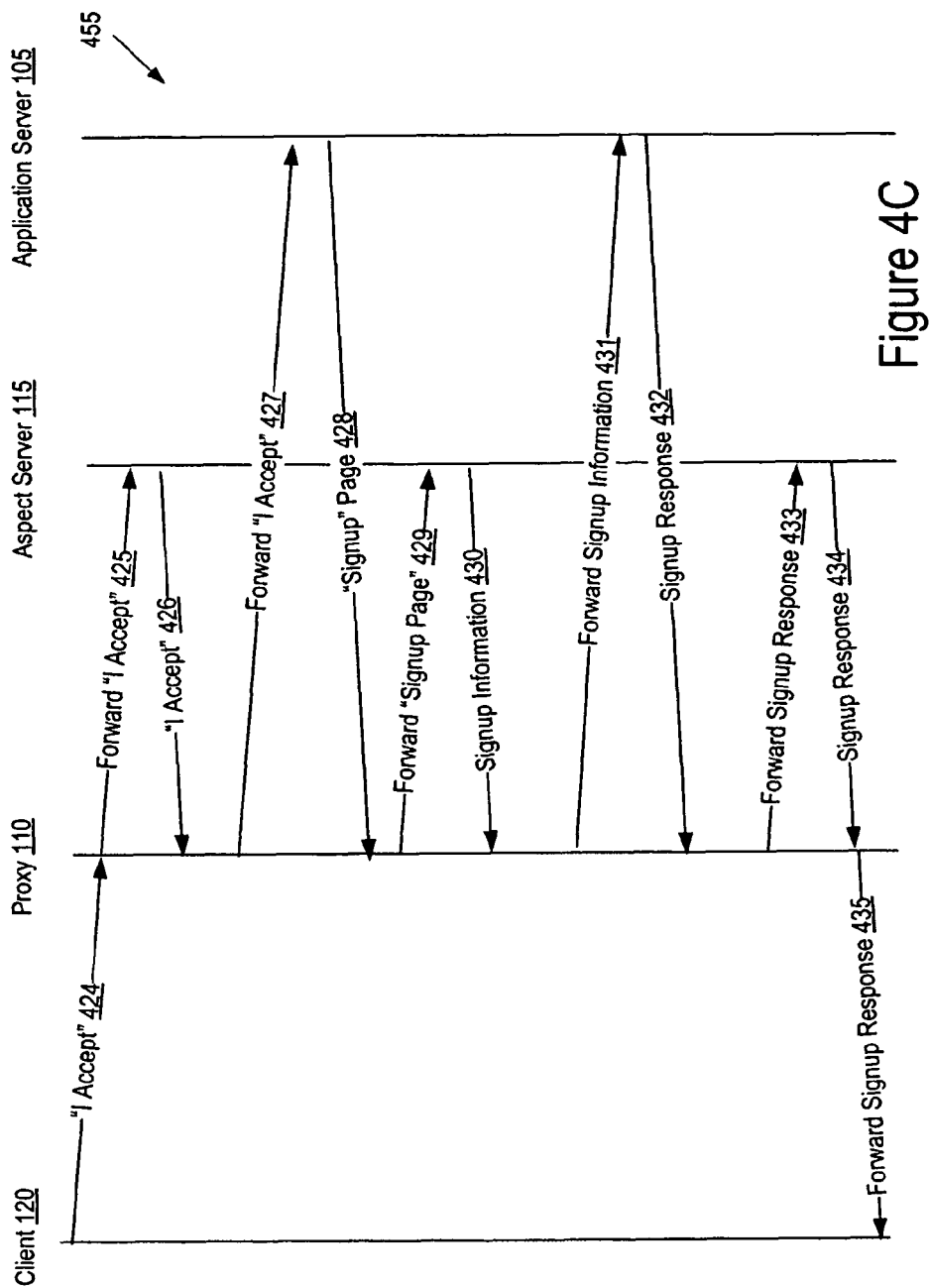
FIG. 4C is a continuation of the data flow diagram of FIG. 4B.

FIG. 4A illustrates a diagram 400 that shows data transmitted between client 120 and application server 105 of FIG. 1. In this embodiment, no aspect service is initiated; therefore, proxy server 110 and aspect server 115 are not shown. Diagram 400 illustrates an example of an original workflow of application server 105. FIGS. 4B and 4C, which will be described in great detail later, illustrate a reordered workflow of application server 105 without any change to the application server.

Referring to FIG. 4A, at transmission 451, client 120 sends a request to application server 105 for an online service. For example, the online service may be a new user signup service, which provides a "terms of service" agreement, and solicits user information if the user accepts the terms. The new user signup service may be presented to the user at client 120 as a sequence of web pages. The request sent by client 120 includes a URL of the first page of the sequence of web pages. In response to the request, at transmission 452, application server 105 sends the first page that contains the "terms of service" agreement. At transmission 453, client 120 sends an indication "I accept," indicating that the user at client 120 accepts the agreement. In response, at transmission 454, application server 105 sends a signup page soliciting user information. After the user enters the information, at transmission 455, client 120 sends the information to application server 105.

In one embodiment, aspect server 115 may modify the sequence of web pages provided by application server 105 without modifying the applications on application server 105. For example, it may be recognized that user information needs to be validated before the terms of service agreement is presented to client 120. Thus, the web pages are to be reordered such that the signup page is to be presented to client 120 before the terms of service page. The reordering of web pages can be performed by aspect server 115, which applies an aspect to add the signup page to the beginning of the web page sequence presented to client 120, and applies another aspect to delete the signup page when the page is served by application server 105. It is understood that the addition of a new web page and deletion of an existing web page may be performed independently in response to different client requests, or may be performed in operations that respond to the same client request.

FIG. 4B illustrates a diagram 450 that shows data transmitted between client 120, proxy server 110, aspect server 115 and application server 105 of FIG. 1, in accordance with one embodiment of the present invention. A vetting service 460 is used to validate the user information (e.g., to determine whether the user qualifies to be a new member of a venture). Vetting service 460 may be provided by aspect server 115, proxy server 110, or any other hosts accessible by aspect server 115.

Referring to FIG. 4B, at transmission 411, a user at client 120 sends a request to application server 105 to be signed up as a new user. The request sent by client 120 includes a URL of the first page of the sequence of web pages (the terms of service page in the above example). At transmission 412, the request is forwarded to aspect server 115 by proxy server 110. Aspect server 115 matches this request with a rule, and determines that a third page in the sequence (the signup page in the above example) is to be presented to client first. Thus, at transmission 413, aspect server 115 sends a response to proxy server 110, notifying proxy server 110 to serve the signup page instead of the terms of service page. Aspect server 115 also notifies proxy server 110 not to contact application server 110 with respect to this change. In one embodiment, aspect server 115 may send the signup page to proxy server 110, or may send a redirect URL in the response. Thus, at transmission 414, proxy server 110 sends the signup page directly to client 120 without going through application server 105. It is noted that transmissions 411-414 follow the same sequence of interactions described in diagram 320 of FIG. 3B.

The signup page solicits signup information from the user of client 120. After client 120 receives the signup page, the user of client 120 enters the signup information and sends the information to proxy server 110 at transmission 415. Proxy server 110 forwards the signup information to aspect server 115 at transmission 416. Aspect server 115 matches the information with a rule, and determines that the information needs validation. At transmission 417, aspect server 115 sends the information to vetting service 460. If the information is not successfully validated, vetting service 460 sends a "not validated" indication to aspect server 115 at transmission 418. At transmission 419, aspect server 115 sends a response to proxy server 110, indicating that the client's request is being considered. At transmission 420, proxy server 110 forwards the response to client 120, indicating that someone will get back to them later.

If vetting service 460 validates the information, it sends a "validated" indication to aspect server 115 at transmission 421. Aspect server 115 saves the signup data with an identifier in storage (either local or remote). The identifier, as described above, may be a session identifier, a MAC computed with client data, a MAC computed with client data and the URL of the signup page, or other identifying means. At transmission 422, aspect server 115 sends a response with the original "terms of service" page to proxy server 110, along with the identifier of the saved client data. Aspect server 115 may also provide an annotated URL to client 120 for the client to post its next request/message. At transmission 423, proxy server forwards the response to client 120.

FIG. 4C illustrates a diagram 455, which is a continuation of diagram 450 of FIG. 4B. Referring to FIG. 4C, at transmission 424, client 120 sends an "I accept" message, indicating that the user at client 120 accepts the agreement. The "I accept" message is sent with a URL of the target of the "I accept" message, as well as the identifier that is either embedded in the URL or is separate from the URL. At transmission 425, proxy server 110 forwards the message to aspect server 115, including the identifier. At transmission 426, aspect server 115 sends the request back to the proxy, either unchanged, or without the identifier that identifies the signup data. At transmission 427, proxy server 110 forwards the "I accept" message to the application server 105. At transmission 428, application server 105 sends a response including the signup page to proxy server 110, according to the original sequence of web pages. At transmission 429, proxy server 110 forwards the "signup page" response to aspect server 115. Aspect server 115 retrieves the saved signup data using the identifier that it received earlier. The saved signed data may be retrieved anytime after aspect server 115 receives the "I accept" message forwarded from proxy server 110. At transmission 430, aspect server 115 sends a request to post (send) the signup data to proxy server 110. At transmission 431, proxy server 110 forwards the request including the signup data to application server 105. At transmission 432, application server 105 sends a signup response to proxy server 110. At transmission 433, proxy server 110 forwards the signup response to aspect server 115. At transmission 434, aspect server 115 sends the unchanged signup response back to the proxy server 110. Transmissions end at transmission 435, where proxy server 110 forwards the signup response back to client 120. It is noted that transmissions 424-435 follow the same sequence of interactions described in diagram 330 of FIG. 3C.

The above sequence of transmissions in FIGS. 4B-4C assumes that the client's signup operation happens without error. For example, an error in the signup information provided by client 120 may be caused by a password mismatch, a password that does not meet security standards, or a username that is either in use or invalid. In an embodiment where signup information is validated by application server 105 instead of aspect server 115, an error in the signup information will not be detected until the information is forwarded to application server 105 (at transmission 431). If the signup response from application server 105 (at transmission 432) indicates an error, aspect server 115 would send an additional signup page to the user of client 120 to request correction. To prevent changes to the portion of the signup information that has already been validated by vetting service 460, aspect server 115 may disallow modification to all of the data items entered by the user except for the erroneous information. For example, new users may be vetted based on geographic criteria. Illustratively, after a user fills in the signup page with his username, password, email address, and mailing address with a country, the information is validated based on the country. The user is then presented with a "terms of service" page, which he accepts. At this point, aspect server 115 submits the signup information to application server 105, which may respond with an error indicating that the username is already in use. The signup page from application server 105 cannot be sent directly to client 120 unmodified, since, in this example, the user should not be allow to modify the country after he accepts the service terms. Aspect server 115 cannot allow the user to change critical information at this point. So rather than sending the signup page with the client data as it is, aspect server 115 can disable the controls with information that should not be changed by the user, or it can just replace those input fields of the form with plain data itself. For example, assume that a user fills in the signup page with the following information (where [ ] indicates an input field that receives data entered by the user):

username: [Fred]
password: [*******]
password: [*******]
email: [fred@example.com]
address: [1234 Example Way]
city: [Exampleville]
state: [AA]
post code: [12345]
country: [US]

Continuing the above example, assume that after going through the vetting process, application server 105 reports that there is already a "Fred", and that the user needs to pick a different username. The subsequent signup page that aspect server 115 directs proxy server 110 to serve will have an input field for the username, but the remainder of the data will show up as either plain data, or in a disabled input field:

username: [Fred]
email: fred@example.com
address: 1234 Example Way
city: Exampleville
state: AA
post code: 12345
country: US The sequence of transmissions in FIG. 4C also assumes that the same aspect server 115 handles all phases of a single client request (that is, proxy server 110 does not forward a client request to one aspect server, and a response from application server 105 to that client request to a different aspect server). This is because aspect server 115 may remove identifying information from a client request to avoid confusing application server 105 in the backend. Thus, a different aspect server may lose track of the state of interactions and may not be able to properly retrieve client information that is saved earlier.

With the operations described above with reference to FIGS. 4B and 4C, aspect server 115 adds the signup page before the "terms of service" page in the original sequence, and deletes the "terms of service" page in the original sequence. In effect, the web pages in the original sequence are reordered without any change to the applications on the application server 105. It is understood that the above example is illustrative and many variations may exist.

Figure 5:
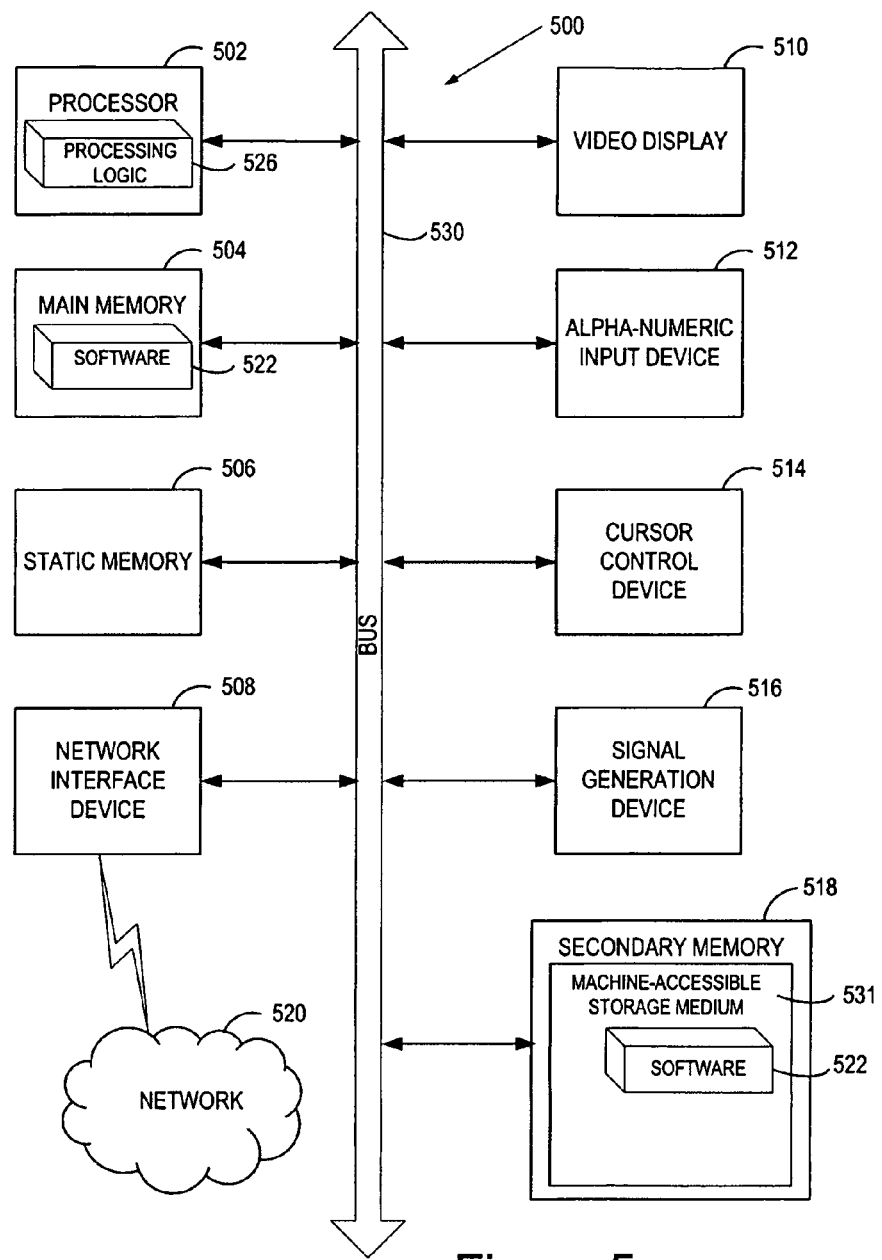
FIG. 5 illustrates a diagrammatic representation of a machine in the exemplary form of a computer systems, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store the rules engine 130, rules 165 and/or aspect services (e.g., first aspect service 135 and second aspect service 140) of FIG. 1A, and/or a software library containing methods that call the rules engine 130, rules 165 and/or aspect services. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer implemented method comprising:
receiving, by a first server, a request from a client, the request being directed to a second server that provides a plurality of web pages in a first sequence, the second server being an application server;
in response to a determination that the request satisfies a criterion, invoking, by the first server, an aspect service that reorders the first sequence of the plurality of web pages to provide the plurality of web pages to the client in a second sequence, the second sequence ordering the plurality of web pages in an order that is different from the first sequence, the aspect service provided by a host that is remote from the application server; and
providing, by the first server, the second sequence of the plurality of web pages to the client without incurring a change to the application server,
the first server being an proxy server.

2. The method of claim 1, further comprising:
receiving the request for a first web page in the first sequence of the plurality web pages; and
providing a second web page in response to the request without informing the application server of the request.

3. The method of claim 1, further comprising:
receiving the request for a first web page in the first sequence of the plurality of web pages;
providing a second web page to the client in response to the request, the second web page soliciting information from the client;
receiving the information solicited by the second web page from the client;
storing the information in data storage; and
retrieving the information from data storage and sending the information to the application server when the application server provides the second web page according to the first sequence of the plurality web pages.

4. The method of claim 1, further comprising:
generating a modified request in response to the request from the client;
receiving a response to the modified request from the application server, the response including a web page that has been provided to the client as a result of reordering the first sequence of the plurality of web pages;
retrieving the information from data storage, the information solicited by the web page; and
sending the information to the application server without informing the client of the response from the application server.

5. The method of claim 1, wherein receiving a request from a client further comprises:
initiating a session in association with the request;
using a session identifier associated with the session to store information provided by the client; and
receiving an additional request from the client, the additional request including a reference to the information; and
in response to the additional request, retrieving the information for the application server using the session identifier.

6. The method of claim 1, further comprising:
forming a Message Authentication Code (MAC) with data submitted by the client;
storing the data with the MAC;
receiving an additional request from the client, the additional request including a Universal Resource Locator (URL) annotated with the MAC; and
retrieving the data using the MAC to provide the data to the application server.

7. The method of claim 6, wherein forming a MAC further comprises:
forming the MAC with the data submitted by the client and a requested URL to which the data submitted by the client is directed.

8. A system comprising:
a data store to store information submitted by a client;
one or more aspect servers coupled to the data store, the aspect servers to:
receive a request from the client, the request being directed to an application server that provides a plurality of web pages in a first sequence;
reorder the first sequence of the plurality of web pages provided by the application server to provide the plurality of web pages to the client in a second sequence, the second sequence ordering the plurality of web pages in an order that is different from the first sequence; and provide the second sequence of the plurality of web pages to the client without incurring a change to the application server; and a session manager coupled to the data store, the session manager to store and retrieve the information with an identifier that identifies the information; and a proxy server coupled to the application server and the one or more aspect servers, the proxy server to determine whether to invoke aspect service provided by the one or more aspect servers and which of the one or more aspect servers to forward a message.

9. The system of claim 8, wherein the session manager is located in the one or more aspect servers, the session manager to store and retrieve the information with a session identifier that identifies a session established by the request of the client.

10. The system of claim 8, wherein the session manager is located in the one or more aspect servers, the session manager to compute a Message Authentication Code (MAC) and to use the MAC embedded in a URL (Universal Resource Locator) to store and retrieve the information.

11. A non-transitory computer readable storage medium including instructions that, when executed by a processing system, cause the processing system to perform a method, the method comprising:

receiving, by a first server, a request from a client, the request being directed to a second server that provides a plurality of web pages in a first sequence, the second server being an application server;

in response to a determination that the request satisfies a criterion, invoking, by the first server, an aspect service that reorders the first sequence of the plurality of web pages to provide the plurality of web pages to the client in a second sequence, the second sequence ordering the plurality of web pages in an order that is different from the first sequence, the aspect service provided by a host that is remote from the application server; and providing, by the first server, the second sequence of the plurality of web pages to the client without incurring a change to the application server, the first server being an proxy server.

12. The non-transitory computer readable storage medium of claim 11, wherein the method further comprises:

receiving the request for a first web page in the first sequence of the plurality web pages; and providing a second web page in response to the request without informing the application server of the request.

13. The non-transitory computer readable storage medium of claim 11, wherein the method further comprises:

receiving the request for a first web page in the first sequence of the plurality web pages;

providing a second web page to the client in response to the request, the second web page soliciting information from the client;

receiving the information solicited by the second web page from the client;

storing the information in data storage; and retrieving the information from data storage and sending the information to the application server when the application server provides the second web page according to the first sequence of the plurality web pages.

14. The non-transitory computer readable storage medium of claim 13, wherein retrieving the information from data storage and sending the information to the application server further comprises:

receiving an indication from the application server that the information solicited by a plurality of input fields of the second web page contains an error in a given input field; and re-sending the second web page to the client with the information, the second web page being presented to the client to allow correction only to the given input field.

15. The non-transitory computer readable storage medium of claim 11, wherein the method further comprises:

initiating a session in association with the request;

using a session identifier associated with the session to store information provided by the client; and receiving an additional request from the client, the additional request including a reference to the information; and in response to the additional request, retrieving the information for the application server using the session identifier.

16. The non-transitory computer readable storage medium of claim 11, wherein the method further comprises:

forming a Message Authentication Code (MAC) with data submitted by the client;

storing the data with the MAC;

receiving an additional request from the client, the additional request including a Universal Resource Locator (URL) annotated with the MAC; and retrieving the data using the MAC to provide the data to the application server.

* * * * *